United States Patent [19]

Oishi et al.

[11] 4,159,294

[45] Jun. 26, 1979

[54] METHOD OF MANUFACTURING FIBER-REINFORCED THERMOPLASTIC RESIN OF CELLULAR STRUCTURE

[75] Inventors: Yoshisue Oishi, Osaka; Akihisa Inoue, Hirakata; Hironori Nakabayashi, Osaka, all of Japan

[73] Assignee: Kurashiki Boseki Kabushiki Kaisha, Okayama, Japan

[21] Appl. No.: 849,534

[22] Filed: Nov. 8, 1977

[30] Foreign Application Priority Data

Nov. 18, 1976 [JP] Japan .................................. 51-139189

[51] Int. Cl.$^2$ ............................................. B29D 27/00
[52] U.S. Cl. .................................... 264/45.3; 264/46.7; 264/54; 264/257; 264/DIG. 5; 264/DIG. 17
[58] Field of Search ...................... 264/45.3, 109, 46.5, 264/26, 46.7, 54, 257, DIG. 5, DIG. 17; 425/71; 260/2.5 L

[56] References Cited

U.S. PATENT DOCUMENTS

| | | | |
|---|---|---|---|
| 2,498,785 | 2/1950 | Bennett et al. ................... 260/2.5 L |
| 2,865,790 | 12/1958 | Baer .................................... 264/26 X |
| 2,972,554 | 2/1961 | Muskat et al. .................. 264/45.3 X |
| 3,238,281 | 3/1966 | Kato ..................................... 264/109 |
| 3,378,613 | 4/1968 | Hampshire ......................... 264/45.3 |
| 3,448,489 | 6/1969 | Boggs ..................................... 425/71 |
| 3,746,589 | 7/1973 | Reinke .............................. 264/26 X |
| 3,917,774 | 11/1975 | Sagane et al. ................. 264/45.3 X |
| 3,980,511 | 9/1976 | Proucelle ......................... 264/45.3 |
| 4,025,256 | 5/1977 | Heller .............................. 264/46.5 X |

FOREIGN PATENT DOCUMENTS

48-40864  6/1973  Japan.
49-13218  3/1974  Japan.

*Primary Examiner*—Philip Anderson
*Attorney, Agent, or Firm*—Wenderoth, Lind & Ponack

[57] ABSTRACT

A method of manufacturing a fiber-reinforced thermoplastic resin of cellular structure comprises immersing bundles of filaments of fibrous reinforcing material in a bath containing an emulsion of thermoplastic resin added with a blowing agent, drying the emulsion-impregnated reinforcing filaments, preheating the dried reinforcing filaments, compressing the preheated reinforcing filaments to provide an integrally bonded block of fiber-reinforced thermoplastic resin, and allowing the block to expand. The fiber-reinforced thermoplastic resin of cellular structure is advantageously employed as a light-weight, high strength construction material.

7 Claims, 2 Drawing Figures

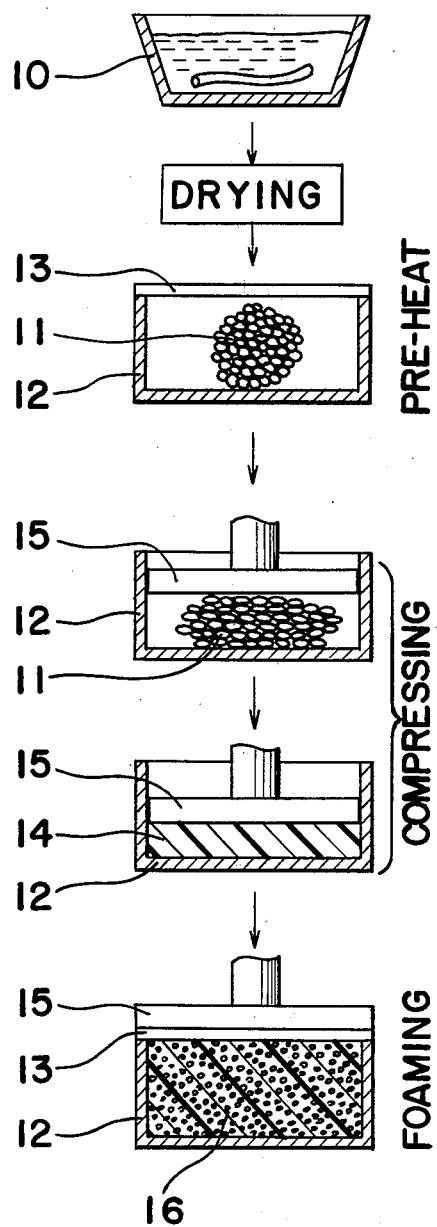
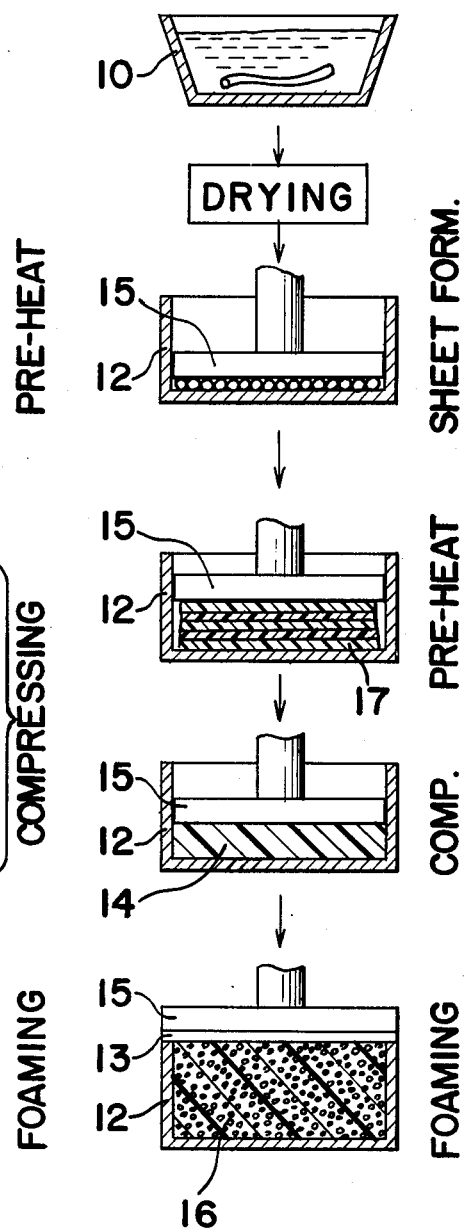

METHOD OF MANUFACTURING FIBER-REINFORCED THERMOPLASTIC RESIN OF CELLULAR STRUCTURE

BACKGROUND OF THE INVENTION

The present invention relates to a method of manufacturing a fiber-reinforced thermoplastic resin of cellular structure. More particularly, the present invention relates to a method of manufacturing a lightweight, high strength construction material made of fiber-reinforced thermoplastic resin of cellular structure and having a specific gravity within the range of 0.2 to 1.0 and other physical properties comparable with those of a natural wood of a kind generally employed as a construction material.

The Japanese Patent Publication No. 48-8468, first published for opposition on Mar. 14, 1973, discloses a fiber-reinforced thermoplastic plate manufactured by applying a thermoplastic resin powder to glass fibers, while the latter are heated to a temperature higher than the softening point of the thermoplastic resin powder, so as to form resin-impregnated glass fibers and then applying a pressure to a mass of the resin-impregnated glass fibers, while the latter are heated to a temperature higher than the fluidizing temperature at which the thermoplastic resin starts its fluidization, to thereby provide the fiber-reinforced thermoplastic plate.

The Japanese Patent Laid-open Publication No. 48-40864, laid open to public inspection on June 15, 1973, discloses a fiber-reinforced thermosetting resin of cellular structure manufactured by applying a solution of expandable thermosetting resin to a plurality of rovings of glass fibers, collecting the resin-impregnated rovings to provide a substantially square-sectioned bundle of the rovings by the use of a bundling mold, applying a pressure to the bundle of the rovings during the passage thereof through the bundling mold to allow the thermosetting resin to be expanded and subsequently cured, and drawing the resultant fiber-reinforced thermosetting resin of cellular structure out of the bundling mold.

In the method of the Japanese Patent Laid-open Publication No. 48-40864, the thermosetting resin is an unsaturated polyester or urethane resin and, since this thermosetting resin even though applied in the liquid form tends to be readily expanded and cured in a relatively short period of time, for example, within 1 to 2 minutes, the thermosetting resin solution does not sufficiently penetrate into interstices of glass fibers making up the individual rovings. The consequence is that the resultant product is not sufficiently reinforced even though mixed with glass fibers.

The Japanese Patent Publication No. 49-31741, first published for opposition on Aug. 24, 1974, discloses a fiber-reinforced thermoplastic resin manufactured by immersing a fiber glass mat in a bath containing an emulsion of thermoplastic resin and then drying the emulsion-impregnated glass mat under heated condition, for example, at 130° C., for a predetermined period of time, for example, 10 minutes. The fiber-reinforced thermoplastic resin according to this Japanese Patent Publication No. 49-31741 has failed to have a cellular structure and, therefore, cannot be used in such an application in which a wooden construction material is employed.

On the other hand, it is generally recognized that the thermoplastic resin, even when reinforced by glass fibers, cannot be improved so much as the thermosetting resin reinforced by glass fibers because most physical properties of the former are inferior to those of the latter. Moreover, although a method for impregnating glass fibers with an emulsion of thermoplastic resin is well known, no method has been found to manufacture a light-weight construction material, similar to the natural wood, by the employment of a blowing agent in the emulsion and this fact illustrates that the mere employment of the thermoplastic resin emulsion does not result in expansion of the thermoplastic resin.

SUMMARY OF THE INVENTION

Accordingly, the present invention has for its essential object to provide a novel method of manufacturing a fiber-reinforced thermoplastic resin of cellular structure which is substantially free from such drawbacks as inherent in a similar product manufactured by the prior art methods referred to above.

Another object of the present invention is to provide the method referred to above capable of producing the fiber-reinforced thermoplastic resin of cellular structure which can satisfactorily and effectively be used as a light-weight, high strength construction material in substitution for a natural wood due to its physical properties comparable with those of the natural wood.

According to the present invention, the fiber-reinforced thermoplastic resin of cellular structure, which resin is hereinafter referred to as a "cellular FRTP product" for the sake of brevity, can be manufactured by immersing a plurality of bundles of filaments of fibrous reinforcing material (each of said bundles of filaments of fibrous reinforcing material being hereinafter referred to as a "reinforcing filament bundle") in a bath containing an emulsion of thermoplastic resin containing a blowing agent, then drying the emulsion-impregnated reinforcing filament bundles, preheating the dried reinforcing filament bundles in readiness for the subsequent process step, compressing the preheated reinforcing filament bundles under heated condition to provide a single block of fiber-reinforced thermoplastic resin, and finally allowing the block of fiber-reinforced thermoplastic resin to be expanded to provide a cellular structure in the thermoplastic resin.

The emulsion-impregnated reinforcing filament bundles may be collected together to provide a single bunch of reinforcing filament bundles prior to or subsequent to the drying step. Alternatively, subsequent to the drying step, the emulsion-impregnated reinforcing filament bundles may be collected together to provide a single sheet of reinforcing filament bundles bonded together.

One of the various features of the present invention resides in the employment of the emulsion of thermoplastic resin which can readily and effectively penetrate into interstices of the fibrous reinforcing filaments making up each bundle. In general, it is well recognized that the thermoplastic resin, even when reinforced by glass fibers, cannot be improved so much as the thermosetting resin reinforced by glass fibers because most physical properties of the former are inferior to those of the latter. Despite this general notion, the method of manufacturing the cellular FRTP product according to the present invention is effective to make the best use of the thermoplastic resin, in the form of an emulsion, to provide the cellular FRTP product which is light in weight and high in physical strength and has a specific gravity within the range of 0.4 to 0.6 and improved resistance to impact, thermal deformation and corrosion.

Another feature of the present invention resides in the employment of the blowing agent added to the emulsion of thermoplastic resin. The employment of the blowing agent advantageously participates in formation of the cellular structure in the resultant FRTP product and consequent reduction in weight of the cellular FRTP product.

A further feature of the present invention resides in the effectuation of the compression to provide an integrally bonded block of fiber-reinforced thermoplastic resin prior to the latter being expanded. The integrally bonded block so formed by the compression has no substantial interstices of the reinforcing fibers, but the thermoplastic resin sticking to the reinforcing filament bundles are integrated together. By the employment of the compression step, the cellular FRTP product having uniformly distributed fine porosities can be ultimately obtained when the blowing agent is decomposed during the subsequent expansion process.

By way of example, according to the method of the present invention, the cellular FRTP product which is light in weight and which has a specific gravity of about 0.5 and a flexural strength of 700 to 800 kg/cm$^2$ can be manufactured if the amount of glass fibers employed as a reinforcing material in the cellular FRTP product is 30% by weight relative to the total weight of the cellular FRTP product so manufactured.

The cellular FRTP product manufactured by the method of the present invention can be used as a lightweight, high strength construction material and has a specific gravity within the range of 0.4 to 0.6 and other physical properties comparable with a similar construction material made of a natural wood. In addition to the light weight and high strength features, the cellular FRTP product according to the present invention has a high impact resistance, a high resistance to thermal deformation and a high corrosion resistance. Therefore, the cellular FRTP product according to the present invention can also be used as a material for equipment, such as a liquid purifying tank and a liquid treating bath, to be used in chemical plants and a cushioning material for marine use.

According to the present invention, each of the filaments of reinforcing material may be either a synthetic resin fiber, such as polyester fiber, polyamide fiber or vinylon fiber, or a carbon fiber. The reinforcing filament bundles may have a shape of a roving, a yarn, a mat or a cloth.

The emulsion of thermoplastic resin to which is added the blowing agent must have a minimum film forming temperature of 50° to 200° C., preferably, 70° to 150° C. The principal constituent of the emulsion may be one or a mixture of polyvinyl chloride, methacrylic acid ester, styrene and acrylonitrile, or any one of acrylonitrile-styrene copolymer and acrylonitrile-butadiene-styrene copolymer.

The blowing agent added to the emulsion may be an organic decomposable blowing agent such as azodicarbonamide or 2,2'-azobisisobutyronitrile. This blowing agent may be added to the emulsion of thermoplastic resin in the form of a water dispersion or an emulsion.

The emulsion of the composition described above may contain some or all of plasticizer, fire retardant, lubricant, stabilizer, filler and coloring agent. These may, if employed, be added to the emulsion in the form of a water dispersion or an emulsion.

BRIEF DESCRIPTION OF THE DRAWINGS

These and other objects and features of the present invention will become apparent from the following description taken in conjunction with preferred embodiments thereof with reference to the accompanying drawings, in which:

FIG. 1 and 2 are illustrative process flow charts showing a method of the present invention according to alternative embodiments thereof, respectively.

DETAILED DESCRIPTION OF THE INVENTION

Before the description of the present invention proceeds, it is to be noted that like parts are designated by like reference numerals throughout the accompanying drawings.

Referring first to FIG. 1, in order to manufacture the cellular FRTP product according to the present invention, a plurality of reinforcing filament bundles, for example, a plurality of rovings of glass fibers, are simultaneously or separately immersed in a bath 10 containingtherein an emulsion of thermoplastic resin added with a blowing agent. The glass fiber rovings, which have been impregnated with the emulsion, are dried in a drying furnace by the application of a heated air to remove water content and solvent vapor therefrom. This drying must be sufficiently performed, or otherwise the ultimate cellular FRTP product will contain undesirable voids.

It is to be noted that, so far as the embodiment shown in FIG. 1 is involved, the glass fiber rovings may be collected together to provide a substantially circular-sectioned bunch of rovings, such as substantially shown by 11 in FIG. 1, either immediately after the immersing step and prior to the drying step or immediately after the drying step. Whether the rovings are to be collected together to provide the bunch 11 immediately after the immersing step or whether they are to be collected together to provide the bunch 11 immediately after the drying step may be determined in consideration of the readiness and easiness of drying of the rovings impregnated with the emulsion.

The bunch 11 of the rovings are then preheated to a predetermined temperature for a predetermined period of time within a heated mold assembly. The heated mold assembly may be of any known construction, but is shown to comprise a mold 12 and a closure plate 13 for selectively opening and closing the top opening of the mold 12.

The preheated bunch 11 of the rovings is then compressed by the use of any known press under heated condition to provide a substantially sheet-like block of fiber-reinforced thermoplastic resin such as indicated by 14 in FIG. 1. Specifically, after the closure plate 13, which has been used to close the top opening of the mold 12 during the preheating step, has been removed and the mold 12 with the bunch 11 therein has been placed on a press bed forming a part of the press, a heated ram plate 15, which also forms a part of the press and has a surface area complemental to the cross sectional area of the interior of the mold 12, is driven into the interior of the mold 12 to compress the bunch 11. For example, this compression may be carried out by applying a pressure of 30 kg/cm$^2$ for 2 to 3 minutes to the bunch 11 within the mold 12. The temperature of the bunch 11 being compressed should be lower than the temperature at which the blowing agent employed starts its decomposition and, therefore, during the compression step, the bunch 11 does not expand, but the glass fiber rovings forming such bunch 11 are "integrally bonded" to provide the substantially sheet-like block of fiber-reinforced thermoplastic resin such as indicated by 14 in FIG. 1. It is to be noted that the term "integrally bonded block" hereinbefore and hereinafter employed is intended to mean that thermoplastic resin particles impregnated in the glass fiber rovings during the immersing step and subsequently dried are integrally bonded together with interstices among glass fibers diminished, by applying a pressure at a temperature not more than the temperature of decomposition of the blowing agent while the resin-impregnated glass fiber rovings are placed within the mold assembly.

The compression carried out in the manner described above is effective to prevent any possible escapement of gases which may be evolved upon decomposition of the blowing agent during the subsequent foaming process and thereby to cause the ultimate FRTP product to have a fine cellular structure. Without the compression effected, escapement of the gases will take place during the subsequent foaming process which may result in formation of undesirable voids in the resultant cellular FRTP product.

It is to be noted that the conditions under which the compression process is effected vary depending upon the type of thermoplastic resin for the emulsion, the type of the blowing agent employed and the desired size of the resultant cellular FRTP product. A similar notion can equally apply to the conditions under which the subsequent foaming process is effected. However, these conditions, particularly, pressure and temperature parameters, can be found by conducting a series of experiments.

After the compression step, the mold 12 with the sheet-like block 14 of fiber-reinforced thermoplastic resin therein is again closed by the closure plate 13 and a pressure is applied to the closure plate 13 for the purpose as will become clear from the subsequent description. The pressure to be applied to the closure plate 13 on the mold 12 may be imparted by the heated ram plate 15 resting on the closure plate 13. Under this condition and while the mold assembly is still heated to a predetermined temperature so that the resin block 14 within the mold 12 can be heated to a temperature higher than the temperature at which the thermoplastic resin employed can be fused and, also, at which the blowing agent employed can undergo its decomposition, the resin block 14 is allowed to expand within the mold 12 to form a fiber-reinforced thermoplastic resin of cellular structure as indicated by 16 in FIG. 1.

Without the pressure applied to the closure plate 13 during the foaming step, the resin block being expanded will blow off the closure plate 13.

Upon completion of the expansion of the resin block 14 to provide the cellular FRTP product 16, the product is allowed to cool and then removed from the mold 12.

Alternatively, as shown in FIG. 2, without the emultion-impregnated rovings being collected together to provide the bunch 11 such as effected according to the previously described embodiment of the present invention, they may be collected and placed on the bottom of the mold 12 in side-by-side relation to each other and, then, pressed by the ram plate 15 to provide a single sheet of fiber reinforced thermoplastic resin such as substantially shown by 17. After a predetermined number of resin sheets 17 have been so formed one at a time in the manner as hereinabove described, they may be stacked one above the other within the mold 12 and preheated to a predetermined temperature in readiness for the subsequent process step for a predetermined period of time while a stack of the resin sheets 17 are lightly pressed by the heated ram plate 15 imposing such a pressure as to avoid any possible curling of any one of the resin sheets 17 forming the stack.

After the predetermined period of time during which the preheating is effected, the stack of the resin sheets 17 are compressed to provide the substantially sheet-like block 14 of fiber-reinforced thermoplastic resin in a manner similar to that described in connection with the foregoing embodiment with reference to FIG. 1.

The subsequent process steps to be effected in the embodiment shown in FIG. 2 is substantially identical with that in the embodiment shown in FIG. 1.

It is to be noted that the amount of glass fiber contained in the resultant cellular FRTP product according to the present invention is, according to a series of experiments conducted by the inventors, to be selected such as to be within the range of 20 to 50%, preferably, 25 to 35%, relative to the total weight of the final product. If the amount of glass fiber contained in the resultant cellular FRTP product is not more than 20 wt%, the resultant cellular FRTP product will lack a sufficient strength and, if it be not less than 50 wt%, the resultant cellular FRTP product will contain undesirably large cells with consequent reduction in matrix strength.

Hereinafter, the present invention will be described by way of examples for the purpose of illustration only.

EXAMPLE I 200 parts of commercially available emulsion of styrene-acrylonitrile-methyl methacrylate copolymer (50% solid particles), which is identified by a trade name "POLYSOL OLX-6043" and manufactured and sold by Showa HIgh Polymer Co., Ltd. of Japan, was mixed with a water dispersion containing 7 parts of water, 3 parts of a commercially available blowing agent, identified by a trade name "CELLMIC C-200" and manufactured and sold by Sankyo Kasei Co., Ltd. of Japan, and 0.12 part of a commercially available dispersing agent identified by a trade name "DEMOL NL" and manufactured and sold by Kao-ATLAS Co., Ltd. of Japan. The blowing agent employed is of a type capable of decomposing at a temperature of 200° C.

Glass fiber rovings, manufactured and sold by Asahi Fiber Glass Co., Ltd. of Japan under a trade name "Glassron R-4450", were immersed in the emulsion, prepared in the same manner as hereinabove described, and subsequently dried in a drying furnace by the application of a drying medium heated to a temperature within the range of 130° to 150° C.

The emulsion-impregnated and subsequently dried rovings were found to contain glass fibers in an amount of 30% by weight relative to the total weight of the dried rovings.

Thereafter, 44 glass fiber rovings, each being 40 cm. in length, were, after having been placed into the mold of 2×6×40 cm. in size heated to a temperature of 180° C., preheated for 10 minutes while a slight pressure is applied thereto by means of the heated ram plate substantially shown in FIG. 1. The glass fiber rovings preheated were compressed at 180° C. by the application of a gauge pressure of 30 kg/cm² for 3 minutes to provide a substantially sheet-like block of fiber-reinforced thermoplastic resin. After the pressure applied by means of the heated ram plate to form the resin block within the mold had been released, the mold with the resin block therein was closed by the closure plate with a gauge pressure of 50 kg/cm$^2$ applied to the closure plate by means of the heated ram plate. This condition was maintained for 15 minutes, while the temperature was increased from 180° C. to 220° C., to allow the resin block within the mold to expand. The expanded resin block within the mold was then allowed to cool and removed from the mold, whereby the cellular FRTP product, 2×6×40 cm. in size and having a fine cellular structure, was obtained. Physical properties of the cellular FRTP product are tabulated in a Table together with those of cellular FRTP products according to other examples.

EXAMPLE II 54 emulsion-impregnated and dried glass fiber rovings, prepared in the same manner as in Example I and containing glass fiber in an amount of 40% by weight relative to the total weight of the dried rovings, were preheated, compressed and allowed to expand in the same conditions as in Example I. The resultant cellular FRTP product, 2×6×40 cm. in size and having such physical properties as shown in the Table was obtained, but the cellular structure thereof was found to be somewhat coarse as compared with that of the cellular FRTP product of Example I.

EXAMPLE III

By utilizing the same method as in Example I, the cellular FRTP product containing glass fiber in an amount of 50% relative to the total weight of the product was obtained. The product so obtained was comfortable to see, but had somewhat coarse porosities in its cellular structure. The physical properties of the product so obtained are shown in the Table.

EXAMPLE IV

The emulsion-impregnated and dried glass fiber rovings, containing glass fibers in an amount of 30% relative to the total weight thereof, were prepared in the same way as in Example I. Of these, 14 rovings each having a length of 40 cm. were arranged in side-by-side relation to each other within the mold heated to 160° C. and then preheated for 3 minutes. Thereafter, by the application of the pressure transmitted to the rovings within the mold through the heated ram plate, the rovings were compressed to provide a sheet of fiber-reinforced thermoplastic resin substantially as shown in FIG. 2.

When three sheets of fiber-reinforced thermoplastic resin were prepared, they were placed into and stacked one above the other within the mold of 2×6×40 cm. in size which was heated to 180° C. The stack of the resin sheets, after having preheated for 3 to 5 minutes, was compressed by the application of the gauge pressure of 30 kg/cm$^2$, which was transmitted thereto through the heated ram plate, to provide a substantially sheet-like block of fiber-reinforced thermoplastic resin. After the pressure applied by means of the heated ram plate to form the resin block within the mold had been released, the mold with the resin block therein was closed by the closure plate with a pressure of about 50 kg/cm$^2$ applied to said closure plate by means of the heated ram plate. This condition was maintained for 15 minutes, while the temperature was increased from 180° C. to 220° C., to allow the resin block within the mold to expand. The expanded resin block was then allowed to cool and removed from the mold, whereby the cellular FRTP product, 2×6×40 cm. in size and having such physical properties as shown in the Table was obtained. The product was satisfactory since the cellular structure was composed of uniformly distributed fine porosities.

EXAMPLE V 10 glass fiber rovings were immersed in the emulsion of the same composition as in Example I, then dried in the drying furnace heated to about 140° C. and were allowed to pass through juxtaposed pressure applying rolls, which were heated to 100° C., thereby providing a sheet, about 1 mm. in thickness, of fiber-reinforced thermoplastic resin containing glass fibers in an amount of 32% by weight relative to the total weight of the fiber-reinforced thermoplastic resin.

The fiber-reinforced thermplastic resin sheet so obtained was cut to have a width of 6 cm. and a length of 40 cm., and 5 strips were placed into and stacked one above the other within the mold heated to 180° C. While these 5 strips were applied with a pressure transmitted thereto by means of the heated ram plate, they were preheated for 5 minutes at 180° C. Thereafter, they were compressed for 2 minutes by the application of a gauge pressure of 30 kg/cm$^2$, transmitted thereto through the heated ram plate. After the compression, the closure plate was mounted on the top opening of the mold and, then, a pressure was applied to the compressed product within the mold by means of the heated ram plate. This condition was maintained for 15 minutes, while the mold assembly was heated to 220° C., to allow the compressed product within the mold to expand. The expanded resin within the mold was then allowed to cool and removed from the mold, whereby the cellular FRTP product, having such physical properties as shown in the Table and having a fine cellular structure, could be obtained.

EXAMPLE VI

Glass fiber rovings were immersed in the emulsion of the same composition as in Example I, then cut to provide 42 resin-impregnated glass fiber rovings each being 50 cm. in length. These glass fiber rovings, 50 cm. in length, were subsequently bundled and dried in the drying furnace by the application of a heated air of 180° C. The roving bundle so dried contained glass fibers in an amount of 30% by weight relative to the total weight thereof and was cut to have a length of 40 cm. The roving bundle, 40 cm. in length, was preheated at 180° C. for 7 minutes while it was placed within the mold and applied with a pressure transmitted thereto through the heated ram plate. After the preheating, compression was effected by the application of a gauge pressure of 30 kg/cm$^2$ for 2 minutes and, thereafter, the closure plate was mounted on the top opening of the mold and was applied with a pressure by means of the heated ram plate resting thereon. This condition was maintained for 15 minutes, while the mold assembly was heated to 220° C., to allow the compressed resin to expand. The expanded resin within the mold was allowed to cool and removed from the mold, whereby the cellular FRTP product, having such physical properties as shown in the Table and having uniformly distributed glass fibers in it, was obtained.

EXAMPLE VII 10 carbon fiber rovings, manufactured and sold by Toray Co., Ltd. of Japan under a trade name "TORAYCA T-300", were immersed in the emulsion of the same composition as in Example I, dried in the drying furnace by the application of a heated air of about 140° C., and cut to a length of 40 cm. The resultant resin-impregnated and dried rovings contained carbon fibers in an amount of 30% by weight relative to the total weight thereof. 45 bundles of the resin-impregnated and dried carbon fiber rovings of 40 cm. in length, each bundle consisting of 10 carbon fiber rovings, were preheated, compressed and expanded in the same manner and under the same conditions as in Example I. The resultant cellular FRTP product had such physical properties as shown in the Table and had a cellular structure of uniformly distributed porosities.

EXAMPLE VIII 20 vinylon fiber rovings, manufactured and sold by Kuraray Co., Ltd. under a trade name "Vinylon Roving 5501", were immersed in the emulsion of the same composition as in Example I and dried in the drying furnace by the application of a heated air of about 140° C. to give resin-impregnated vinylon fiber rovings containing vinylon fibers in an amount of about 27% by weight relative to the total weight thereof. The resin impregnated vinylon fiber rovings were cut to a length of 40 cm. 41 bundles of the resin-impregnated vinylon fiber rovings, each bundle consisting of 20 vinylon fiber rovings, were preheated, compressed and expanded in the same manner and under the same condition as in Example I, except for the compression stem being effected at 200° C. for 14 minutes. The resultant cellular FRTP product had such physical properties as shown in the Table and had a cellular structure of uniformly distributed porosities with vinylon fibers uniformly distributed.

COMPARISON

Glass fiber rovings were immersed in the emulsion of the same composition as in Example I and dried in the same manner as in Example I to give the resin-impregnated and dried glass fiber rovings containing glass fibers in an amount of 50% by weight relative to the total weight of the resin-impregnated and dried rovings. These rovings were cut to a length of 40 cm., and the same number of the cut rovings as in Example I were, while sandwiched between the bottom of the mold heated to 180° C. and the heated ram plate, preheated at 180° C. for 10 minutes within the mold and, without being compressed, were allowed to expand within the mold. The expansion was effected for 15 minutes under a pressure while the temperature was increased up to 220° C. The resultant product, removed from the mold assembly after it had been cooled, failed to represent an acceptable cellular structure.

Table

| PRODUCT OF EXAMPLE | TYPE OF REINFORCING FIBER | CONTENT OF REINFORCING FIBER (wt-%) | SPECIFIC GRAVITY | FLEXURAL STRENGTH (kg/cm$^2$) | MODULUS IN FLEXURE (kg/cm$^2$) |
|---|---|---|---|---|---|
| I | glass | 32 | 0.51 | 736 | 47,900 |
| II | glass | 40 | 0.50 | 631 | 41,200 |
| III | glass | 52 | 0.52 | 457 | 49,300 |
| IV | glass | 31 | 0.49 | 682 | 45,100 |
| V | glass | 32 | 0.53 | 739 | 46,500 |
| VI | glass | 31 | 0.50 | 863 | 48,400 |
| VII | carbon | 30 | 0.51 | 918 | 90,100 |
| VIII | vinylon | 27 | 0.52 | 700 | 39,100 |

Although the present invention has been fully described in connection with the preferred embodiments thereof with reference to the accompanying drawings, it is to be noted that various changes and modifications are apparent to those skilled in the art. Such changes and modifications are to be understood as included within the true scope of the present invention unless they depart therefrom.

What is claimed is:

1. A method of manufacturing a fiber-reinforced thermoplastic resin of cellular structure which comprises the steps of:
   immersing a roving of filaments of glass fibrous reinforcing material in a bath containing an emulsion of thermoplastic resin containing a blowing agent, said emulsion having a minimum film forming temperature of not less than 50° C.;
   collecting a plurality of the emulsion-impregnated rovings together to provide a bunch of rovings;
   squeezing out the excess emulsion and drying the bunch of rovings to obtain a resultant product containing glass fibers in an amount of about 30% by weight relative to the total weight of the dried rovings;
   preheating the dried bunch of rovings at a temperature in which the thermoplastic resin is softened but the blowing agent does not decompose;
   compressing the preheated bunch of rovings within a press bed under heated conditions having the same temperature as that of said preheating step to provide an integrally bonded block of the fiber-reinforced thermoplastic resin in such a manner that the thermoplastic resin particles impregnated in the immersing step and subsequently dried are integrally bonded together with interstices among glass fibers diminished, by applying a pressure at a temperature lower than the temperature of decomposition of the blowing agent;
   allowing the integrally bonded block of fiber-reinforced thermoplastic resin to expand within a mold under heated condition at a temperature higher than the temperature at which the thermoplastic resin employed can be fused and, also, at which the blowing agent employed undergoes decomposition, thereby providing a fiber-reinforced thermoplastic resin of cellular structure the amount of glass fiber contained therein being within the range of 20 to 50% relative to the total weight of the final product; and
   cooling the fiber-reinforced thermoplastic resin of cellular structure to ambient temperature.

2. A method as claimed in claim 1, wherein the blowing agent is added to the emulsion of thermoplastic resin in the form of a water dispersion or an emulsion.

3. A method as claimed in claim 1, wherein the blowing agent is an organic decomposable blowing agent and wherein said emulsion contains at least one member of the group consisting of plasticizer, fire retardant, lubricant, stabilizer, filler and coloring agent.

4. A method as claimed in claim 1, wherein a volume-changeable mold assembly is employed as the press bed and as the mold in said compressing and expanding steps, the former being effective within the small volume of the mold assembly while the latter is effective within the large volume of the mold assembly.

5. A method of manufacturing a fiber-reinforced thermoplastic resin of cellular structure which comprises the steps of:

immersing a roving of glass filaments of fibrous reinforcing material in a bath containing an emulsion of thermoplastic resin containing a blowing agent, said emulsion having a minimum film forming temperature of not less than 50° C.;

squeezing out the excess emulsion and drying the emulsion-impregnated rovings to obtain a resultant product containing glass fibers in an amount of about 30% by weight relative to the total weight of the dried rovings;

collecting a plurality of the dried rovings together to provide a bunch of rovings;

preheating the dried bunch of rovings at a temperature in which the thermoplastic resin is softened but the blowing agent does not decompose;

compressing the preheated bunch of rovings within a press bed under heated conditions having the same temperature as that of said preheating step to provide an integrally bonded block of the fiber-reinforced thermoplastic resin in such a manner that the thermoplastic resin particles impregnated in the immersing step and subsequently dried are integrally bonded together with interstices among glass fibers diminished, by applying a pressure at a temperature lower than the temperature of decomposition of the blowing agent;

allowing the integrally bonded block of fiber-reinforced thermoplastic resin to expand within a mold under heated condition at a temperature higher than the temperature at which the thermoplastic resin employed can be fused and, also, at which the blowing agent employed undergoes decomposition, thereby providing the fiber-reinforced thermoplastic resin of cellular structure the amount of glass fiber contained therein being within the range of 20 to 50% relative to the total weight of the final product; and cooling the fiber-reinforced thermoplastic resin of cellular structure to the ambient temperature.

6. A method as claimed in claim 5, wherein the blowing agent is added to the emulsion of thermoplastic resin in the form of a water dispersion or an emulsion.

7. A method as claimed in claim 5, wherein a volume-changeable mold assembly is employed as the press bed and as the mold in said compressing and expanding steps, the former being effective within the small volume of the mold assembly while the latter is effective within the large volume of the mold assembly.

* * * * *